US012615517B2

(12) United States Patent
Khalid

(10) Patent No.: US 12,615,517 B2
(45) Date of Patent: Apr. 28, 2026

(54) SAS-TO-SAS CO-ORDINATION FOR BASE STATION CONFIGURATION

(71) Applicant: Charter Communications Operating, LLC, St. Louis, MO (US)

(72) Inventor: Saran Khalid, Denver, CO (US)

(73) Assignee: Charter Communications Operating, LLC, St. Louis, MO (US)

( * ) Notice: Subject to any disclaimer, the term of this patent is extended or adjusted under 35 U.S.C. 154(b) by 582 days.

(21) Appl. No.: 18/181,124

(22) Filed: Mar. 9, 2023

(65) Prior Publication Data

US 2024/0305996 A1 Sep. 12, 2024

(51) Int. Cl.
H04W 16/14 (2009.01)
H04W 16/02 (2009.01)

(52) U.S. Cl.
CPC ........... *H04W 16/14* (2013.01); *H04W 16/02* (2013.01)

(58) Field of Classification Search
CPC .............................. H04W 16/14; H04W 16/02
See application file for complete search history.

(56) References Cited

U.S. PATENT DOCUMENTS

| | | | |
|---|---|---|---|
| 8,582,483 B1 | 11/2013 | Yu et al. |
| 9,014,118 B2 | 4/2015 | Proctor, Jr. |
| 10,477,491 B2 | 11/2019 | Mueck et al. |
| 10,623,943 B1 | 4/2020 | Sevindik et al. |
| 10,893,417 B1 | 1/2021 | Gandhi et al. |
| 11,272,575 B1 | 3/2022 | Sevindik |

| | | | |
|---|---|---|---|
| 11,617,182 B2 | 3/2023 | Sevindik |
| 2010/0141762 A1 | 6/2010 | Siann et al. |
| 2014/0185580 A1 | 7/2014 | Fang et al. |
| 2016/0112970 A1 | 4/2016 | Chen et al. |
| 2016/0212624 A1 | 7/2016 | Mueck et al. |
| 2016/0219608 A1 | 7/2016 | Awoniyi-Oteri et al. |
| 2017/0374557 A1 | 12/2017 | Mueck et al. |
| 2018/0049213 A1 | 2/2018 | Gholmieh et al. |
| 2018/0070380 A1 | 3/2018 | Nagaraja et al. |
| 2018/0098289 A1 | 4/2018 | Visotsky et al. |

(Continued)

OTHER PUBLICATIONS

Final Office Action in U.S. Appl. No. 18/597,159; dated Oct. 22, 2025 (7 pages).

(Continued)

*Primary Examiner* — Curtis B Odom
(74) *Attorney, Agent, or Firm* — Mendelsohn Dunleavy, P.C.; Steve Mendelsohn

(57) ABSTRACT

In a wireless communications system, such as a 5G CBRS system, a server maintains an inter-SAS (Spectrum Allocation System) database that stores propagation files for base stations (e.g., Citizens Broadband Radio Service Devices (CBSDs)) associated with different SASs. A first SAS retrieves, from the inter-SAS database, propagation files for other SASs' CBSDs that are nearby a (e.g., new or reconfigured) CBSD associated with the first SAS and uses the retrieved propagation files to assign, to its CBSD, channel(s) that have minimal interference with the other SASs' nearby CBSDs. The first SAS retrieves information about the nearby CBSDs from an FCC database and then communicates with the other SASs about the existence of the nearby CBSDs' propagation files in the inter-SAS database. Each other SAS ensures that the propagation files for its nearby CBSDs are in the inter-SAS database.

24 Claims, 3 Drawing Sheets

(56) References Cited

U.S. PATENT DOCUMENTS

| | | |
|---|---|---|
| 2018/0205437 A1 | 7/2018 | Kim et al. |
| 2018/0278298 A1 | 9/2018 | Takano |
| 2018/0287722 A1 | 10/2018 | Takano |
| 2019/0174554 A1 | 6/2019 | Deenoo et al. |
| 2019/0215698 A1 | 7/2019 | Balachandran et al. |
| 2019/0223025 A1 | 7/2019 | Kakinada |
| 2019/0306850 A1 | 10/2019 | Zhang et al. |
| 2020/0008081 A1 | 1/2020 | Ashrafi |
| 2020/0068548 A1 | 2/2020 | Guan et al. |
| 2020/0084780 A1 | 3/2020 | Wiatrowski et al. |
| 2020/0329523 A1 | 10/2020 | Yi et al. |
| 2020/0351818 A1 | 11/2020 | Park et al. |
| 2021/0014693 A1 | 1/2021 | Syed et al. |
| 2021/0029549 A1 | 1/2021 | Notargiacomo et al. |
| 2021/0029562 A1 | 1/2021 | Notargiacomo et al. |
| 2021/0067974 A1 | 3/2021 | Guo |
| 2021/0168618 A1 | 6/2021 | Yavuz |
| 2021/0227396 A1 | 7/2021 | Khalid et al. |
| 2021/0266209 A1 | 8/2021 | Zach et al. |
| 2021/0282025 A1 | 9/2021 | Bandyopadhyay |
| 2021/0337391 A1 | 10/2021 | Sevindik et al. |
| 2021/0389474 A1* | 12/2021 | Hamzeh ............... H04B 7/1853 |
| 2022/0007198 A1 | 1/2022 | Mahalingam |
| 2022/0007200 A1 | 1/2022 | Sevindik et al. |
| 2022/0007374 A1 | 1/2022 | Sevindik et al. |
| 2022/0070680 A1 | 3/2022 | Furuichi |
| 2022/0303782 A1 | 9/2022 | Litjens |
| 2022/0361171 A1 | 11/2022 | Sevindik |
| 2022/0386131 A1 | 12/2022 | Guo et al. |
| 2022/0386132 A1 | 12/2022 | Sevindik |

OTHER PUBLICATIONS

Non-Final Office Action in U.S. Appl. No. 18/597,159; filed Mar. 6, 2024; dated Jun. 4, 2025.

Notice of Allowance for U.S. Appl. No. 17/308,425; dated Oct. 26, 2023 (9 pages).

Non-Final Office Action for U.S. Appl. No. 17/329,427; dated Sep. 12, 2023 (10 pages).

Non-Final Office Action in U.S. Appl. No. 18/597,159; dated Dec. 19, 2024 (6 pages).

* cited by examiner

100

100

120/150

140

SAS-TO-SAS CO-ORDINATION FOR BASE STATION CONFIGURATION

BACKGROUND

Field of the Disclosure

The present disclosure relates to wireless communications systems and, more specifically but not exclusively, to 5G CBRS communications systems.

Description of the Related Art

This section introduces aspects that may help facilitate a better understanding of the disclosure. Accordingly, the statements of this section are to be read in this light and are not to be understood as admissions about what is prior art or what is not prior art.

In a 5G Citizens Broadband Radio Service (CBRS) communications system, a Spectrum Access System (SAS) is responsible for allocating different portions of the CBRS spectrum to base stations, referred to as CBRS Devices or CBSDs, for short, that handle the wireless communications with user equipment (UEs) located in the geographical areas covered by the CBSDs, where each CBSD is part of a core network associated with a SAS. One of the responsibilities of a SAS is to coordinate the spectrum allocations to the CBSDs of its associated core networks in a way that avoids wireless signal interference between those CBSDs.

If a company operates multiple SASs, then the company can configure its SASs to communicate directly with each other to synchronize their spectrum-allocation databases to coordinate the spectrum allocations between its different SASs to avoid interference between CBSDs of core networks associated with different ones of its SASs. For security and confidentiality reasons, such direct inter-SAS communication is not acceptable for SASs operated by different companies. As a result, there is a risk of interference between CBSDs of core networks in the same geographical area that are associated with different SASs operated by different companies.

SUMMARY

Problems in the prior art are addressed in accordance with the principles of the present disclosure by providing a central "inter-SAS database" server that receives propagation files for CBSDs of core networks associated with different SASs operated by different companies, maintains a single inter-SAS database that stores those propagation files, and makes those propagation files available to the different SASs for each of them to use to coordinate the allocation of spectrum channels to its own associated CBSDs.

In some embodiments, when a core network provisions a new CBSD, a first SAS associated with that core network accesses the FCC universal licensing system database to acquire the identity of any existing CBSDs located near (e.g., within a specified distance from) the new CBSD. For each of those identified existing CBSDs that is associated with a different SAS, the first SAS transmits, to the other SAS, a request for a propagation file for the identified existing CBSD. Upon receipt of the request, the other SAS queries the inter-SAS database server to determine whether the inter-SAS database already has a copy of the requested propagation file for the existing CBSD. If so, then the other SAS informs the first SAS that the requested propagation file is available at the inter-SAS database. If not, then the other SAS requests and receives the requested propagation file from the core network associated with the identified CBSD. The requested propagation file is stored in the inter-SAS database, and the other SAS then informs the first SAS that the requested propagation file is available at the inter-SAS database. The first SAS then requests, receives, and uses the requested propagation file to select one or more channels for the new CBSD that have minimal interference with the existing CBSD. In this way, the present disclosure can be used to reduce interference between CBSDs associated with different SASs.

BRIEF DESCRIPTION OF THE DRAWINGS

Embodiments of the disclosure will become more fully apparent from the following detailed description, the appended claims, and the accompanying drawings in which like reference numerals identify similar or identical elements.

DETAILED DESCRIPTION

Detailed illustrative embodiments of the present disclosure are disclosed herein. However, specific structural and functional details disclosed herein are merely representative for purposes of describing example embodiments of the present disclosure. The present disclosure may be embodied in many alternate forms and should not be construed as limited to only the embodiments set forth herein. Further, the terminology used herein is for the purpose of describing particular embodiments only and is not intended to be limiting of example embodiments of the disclosure.

As used herein, the singular forms "a," "an," and "the," are intended to include the plural forms as well, unless the context clearly indicates otherwise. It further will be understood that the terms "comprises," "comprising," "contains," "containing," "includes," and/or "including," specify the presence of stated features, steps, or components, but do not preclude the presence or addition of one or more other features, steps, or components. It also should be noted that in some alternative implementations, the functions/acts noted may occur out of the order noted in the figures. For example, two figures shown in succession may in fact be executed substantially concurrently or may sometimes be executed in the reverse order, depending upon the functions/ acts involved.

Figure 1:
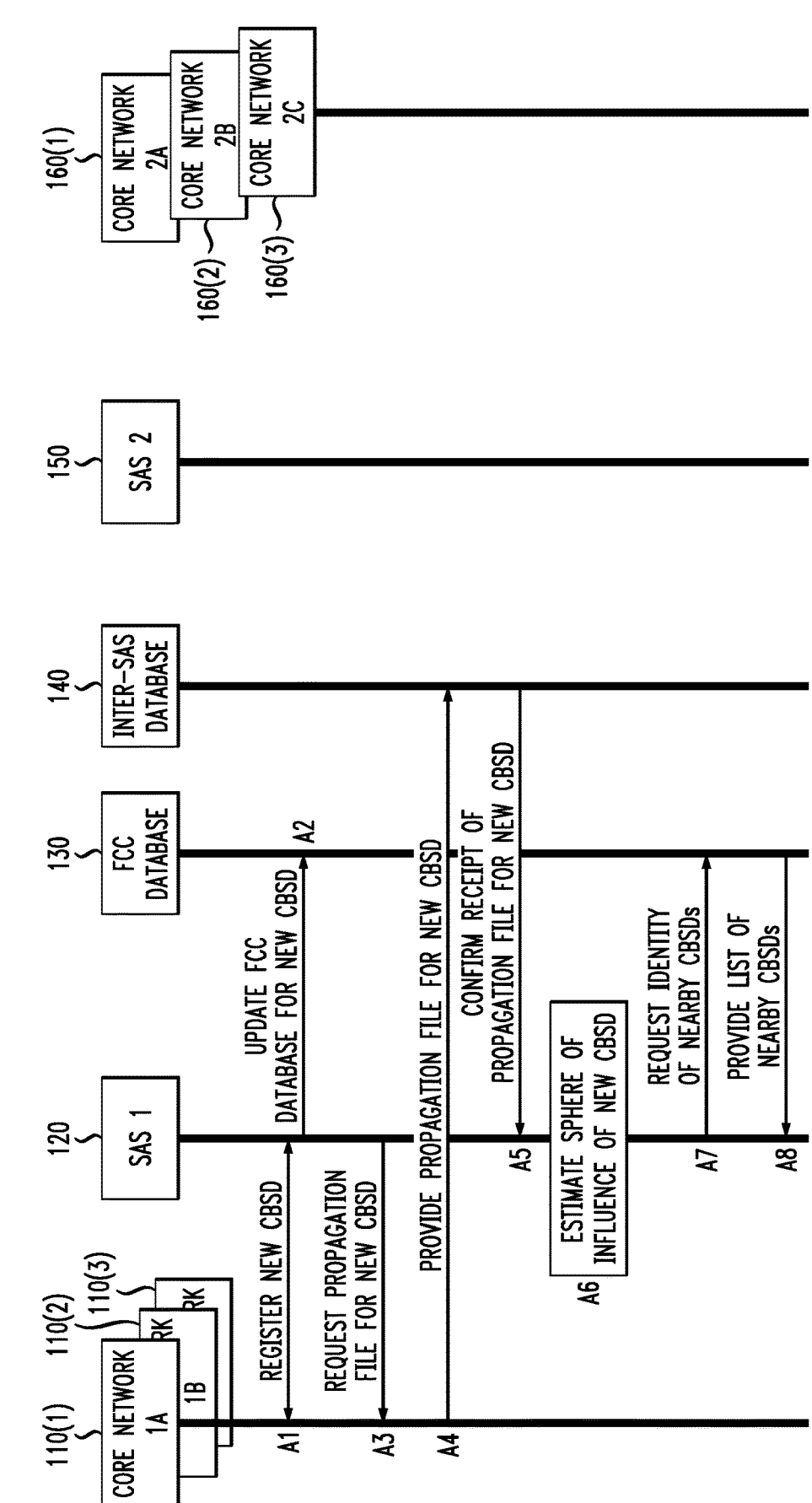
FIG. 1 is message flow diagram representing a particular scenario in which a core network deploys a new CBSD according certain embodiments of the present disclosure.
Figure 1:
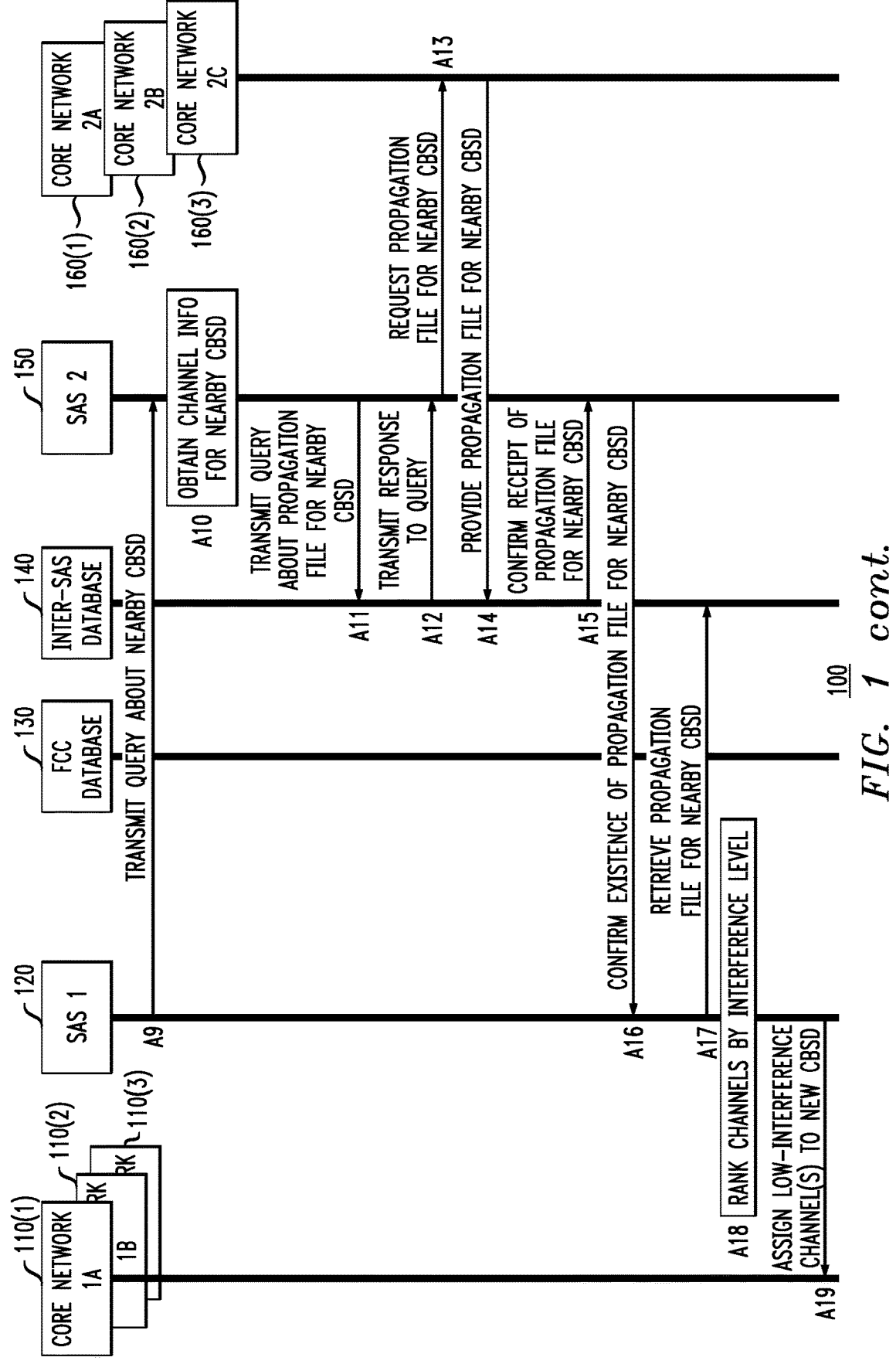

FIG. 1 is message flow diagram representing a particular scenario in which a core network (i.e., core network 110(1)) deploys a new CBSD (not shown in FIG. 1), according to certain embodiments of the present disclosure. Those skilled in the art will understand how to apply the principles of the present disclosure to other scenarios. For example, in an alternative scenario, the CBSD may be an existing CBSD that is to have a different channel configuration assigned to it. FIG. 1 represents messaging transmitted within an infrastructure 100 that includes:

A first SAS 120 that is associated three core networks 110(1)-110(3) and a second SAS 150 that is associated three core networks 160(1)-160(3), each core network having a number of associated CBSDs (not shown in FIG. 1);

The conventional FCC server 130 that maintains the FCC database that stores information about deployed CBSDs; and A new inter-SAS database server 140 that maintains an inter-SAS database, which, according to certain embodiments of the present disclosure, stores propagation files for CBSDs.

As used herein, the term "propagation file" refers to a set of data that characterizes the signal level around a given CBSD. In certain implementations, the area surrounding a given CBSD is logically divided into a grid of bins (e.g., of size 1 meter square), where the propagation file for the CBSD identifies the pathloss in dB from the CBSD's antenna(s) to the center of each bin for the one or more different CBRS channels assigned to that CBSD, taking into account the terrain and clutter within that surrounding area using an empirical, deterministic, or hybrid model formula. Other implementations are also possible.

As represented in FIG. 1, at step A1, the core network 110(1) registers the new CBSD with the first SAS 120. In step A2, the first SAS 120 updates the FCC database at the FCC server 130 with information about the new CBSD. The FCC database stores some or all of the following information about the new CBSD: serial number, category, air interface (e.g., 4G LTR, 5G NR, etc.), location (e.g., longitude and latitude), deployment (e.g., indoor or outdoor), antenna type/model, antenna height, height type (e.g., above ground level (AGL), above mean sea level (AMSL), etc.), antenna azimuth angle, antenna tilt angle, antenna transmit power, antenna gain, antenna beamwidth, antenna frequency range, call sign (i.e., FCC identifier), and city jurisdictions. In certain implementations, communications with the FCC database 130 employ a RESTful API in which information is transmitted using JavaScript Object Notation (JSON) format. Note that alternative embodiments may use databases other than the FCC database maintained in the FCC server 130. For example, the information from the FCC database needed by the SASs could instead be stored in the inter-SAS database or in another database maintained at the inter-SAS database server 140 or in another database maintained at centralized server other than the inter-SAS database server 140. In some embodiments, a robotic software agent (not shown in FIG. 1) acquires the information for this centralized database from the SASs.

In step A3, the first SAS 120 transmits a request to the core network 110(1) for the propagation file for the new CBSD, which is identified by its unique serial number. In response, in step A4, the core network 110(1) provides the requested propagation file, with a tag identifying the new CBSD as being associated with the first SAS 120, to the inter-SAS database server 140, which stores the tagged propagation file in the inter-SAS database. Note that the propagation file is generated for full Effective Isotropic Radiated Power (EIRP) at the CBSD. In step A5, the inter-SAS database server 140 informs the first SAS 120 that the propagation file for the new CBSD has been stored in the inter-SAS database. In an alternative implementation, the core network 110(1) provides the requested propagation file to the first SAS 120, which then provides the propagation file to inter-SAS database server 140.

In step A6, the first SAS 120 estimates the sphere of influence of the new CBSD based on characteristics of the new CBSD such as antenna height and gain, full EIRP level, etc., where the sphere of influence refers to the geographic area around the new CBSD within which the signal level from the new CBSD is above a specified threshold such that signal interference with another CBSD may occur. In one possible implementation, the sphere of influence is characterized by a radial distance corresponding to a circle around the new CBSD. The first SAS 120 may use actual field propagation measurements from drive tests and UE trace data as well as information about the RF environment (e.g., rural, residential, urban) to determine and then update the radial distance in real time. Other implementations are possible. In some alternative embodiments, the updating of the radial distances for different CBSDs may be performed by a centralized server.

In step A7, the first SAS 120 transmits a request to the FCC server 130 for the identity of all existing CBSDs that are located within the specified radial distance from the new CBSD, and, in response, in step A8, the FCC server 130 provides the first SAS 120 with a list of those nearby CBSDs along with an identification of the SASs associated with those nearby CBSDs.

The processing of steps A9-A17 is performed for each nearby CBSD that is associated with a different SAS (e.g., a SAS operated by a company different from the company that operates the first SAS 120). In the example of FIG. 1, the processing of steps A9-A17 is described for a nearby CBSD of core network 160(3) associated with the second SAS 150.

In step A9, the first SAS 120 transmits a query to the second SAS 150 about the existence in the inter-SAS database of a propagation file for the identified nearby CBSD associated with the second SAS 150. In step A10, the second SAS 150 obtains channel information for the nearby CBSD. In step A11, the second SAS 150 queries the inter-SAS database server 140 whether the inter-SAS database already has a propagation file for the nearby CBSD. In step A12, the inter-SAS database server 140 determines whether the inter-SAS database has that propagation file and provides the answer to the second SAS 150.

If the answer is no, then, in step A13, the second SAS 150 transmits a request for a propagation file for the nearby CBSD to the associated core network 160(3), and, in response, in step A14, the core network 160(3) sends the requested propagation file to the inter-SAS database server 140 for storage in the inter-SAS database. In step A15, the inter-SAS database server 140 informs the second SAS 150 that the requested propagation file is now stored in the inter-SAS database. In an alternative implementation, the core network 160(3) provides the requested propagation file to the second SAS 150, which then provides the propagation file to inter-SAS database server 140. In step A16, the second SAS 150 informs the first SAS 120 that the propagation file for the nearby CBSD is now available at the inter-SAS database, and, in step A17, the first SAS 120 sends a message to the inter-SAS database server 140 to retrieve the propagation file for the nearby CBSD from the inter-SAS database.

Note that, in some implementations, steps A9-A17 can be performed for multiple nearby CBSDs associated with the second SAS 150 at the same time with each step referring to a list of the nearby CBSDs. Note that steps A13-A21 may also be performed for one or more other CBSDs associated with one or more other SASs if those CBSDs are also nearby the new CBSDs as identified by the FCC server 130.

In step A18, based on the retrieved propagation file(s) for the nearby CBSD(s), the first SAS 120 determines which channel (or channels, if needed) in the CBRS spectrum would have the least interference with the nearby CBSDs, and, in step A19, the first SAS 120 communicates with the core network 110(1) to assign those one or more determined channels to the new CBSD. In some implementations, the first SAS 120 uses the propagation files for the nearby CBSDs to determine total signal levels for different CBRS channels for each of the grid bins surrounding the new CBSD and then orders the CBRS channels according to the lowest to highest average signal level within the coverage area of the new CBSD to determine the one or more CBRS channels to be assigned to the new CBSD. Other implementations are possible.

In the implementation of FIG. 1, the core networks (e.g., 110/160) generate propagation files for their CBSDs. In another possible implementation, the SASs (e.g., 120/150) generate propagation files for the CBSDs of their associated core networks.

In some implementations, the propagation file for a CBSD is provided to the inter-SAS database server 140 for storage in the inter-SAS database when the CBSD is initially registered. In other implementations, the propagation file for a CBSD is provided to the inter-SAS database server 140 when the propagation file is first requested by another SAS. In some implementations, each propagation file has a time-stamp identifying the date and time of its generation, where the inter-SAS database server 140 purges old propagation files (e.g., older than a specified duration threshold) from the inter-SAS database, thereby relying on subsequent requests to ensure that only recent propagation files are used to assign channels to new CBSDs.

Figure 2:
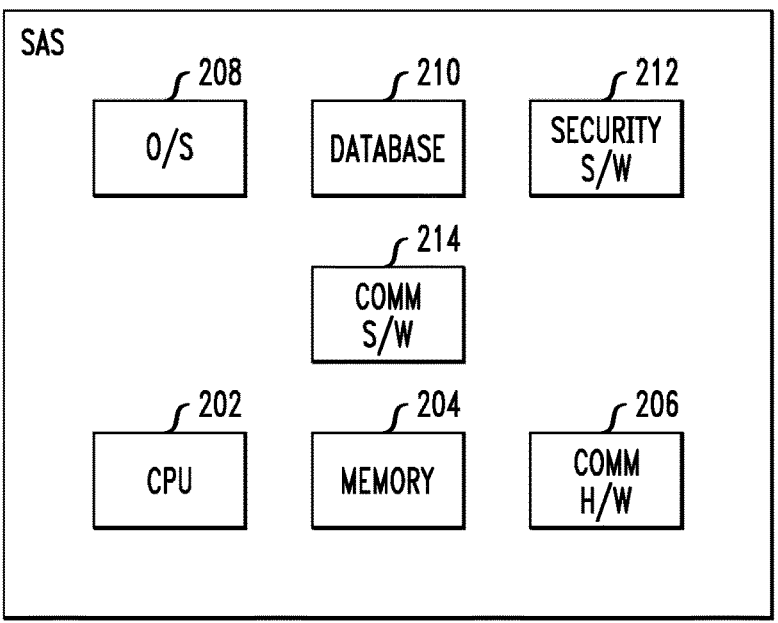
FIG. 2 is a combined hardware/software diagram representing each SAS of FIG. 1 according to certain embodiments of the disclosure.

FIG. 2 is a combined hardware/software diagram representing each SAS 120/150 of FIG. 1 according to certain embodiments of the disclosure. As shown in FIG. 2, the SAS includes hardware components, such as a CPU 202, a memory (e.g., RAM and/or ROM) 204, and communication hardware (e.g., transceivers) 206, and software modules, such as:

An operating system 208 stored in the memory 204 and executed by the CPU 202 to handle the operations of the SAS;

One or more databases 210 stored in the memory 204;

Security software 212 stored in the memory 204 and executed by the CPU 202, including possible encryption and decryption of outgoing and incoming messages; and Communication software 214 stored in the memory 204 and executed by the CPU 202 to control the communication hardware 206 to execute the communications between, for example, (i) the first SAS 120 and (ii) its associated core networks 110(1)-110(3), the FCC server 130, the inter-SAS database server 140, and the second SAS 150.

Figure 3:
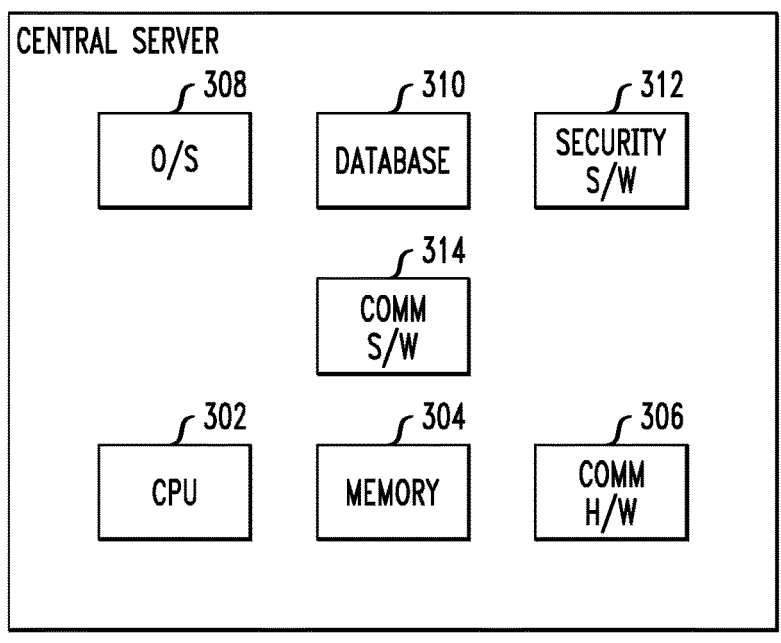
FIG. 3 is a combined hardware/software diagram representing the inter-SAS database server of FIG. 1 according to certain embodiments of the disclosure.

FIG. 3 is a combined hardware/software diagram representing the inter-SAS database server 140 of FIG. 1 according to certain embodiments of the disclosure. As shown in FIG. 3, the server 140 includes hardware components, such as a CPU 302, a memory (e.g., RAM and/or ROM) 304, and communication hardware (e.g., transceivers) 306, and software modules, such as:

An operating system 308 stored in the memory 304 and executed by the CPU 302 to maintain the spectrum-allocation database;

The inter-SAS database 310 stored in the memory 304;

Security software 312 stored in the memory 304 and executed by the CPU 302, including possible encryption and decryption of outgoing and incoming messages;

Communication software 314 stored in the memory 304 and executed by the CPU 302 to control the communication hardware 306 to execute the communications between (i) the server 140 and (ii) the SASs 120/150 and their associated core networks 110/160.

Although the disclosure has been described in the context of 5G CBRS communications systems, those skilled in the art will understand that the present disclosure can be implemented in the context of other suitable communications systems having functionality analogous to the SASs of 5G CBRS communications systems.

In certain embodiments, the present disclosure is a first spectrum allocation system (SAS) comprising a processor connected to a memory and a transceiver, wherein the processor is configured to cause the first SAS to (i) transmit a request for a propagation file for a second-SAS base station associated with a second SAS different from the first SAS and (ii) receive and use the propagation file to configure a first first-SAS base station associated with the first SAS.

In at least some of the above embodiments, the first SAS is configured to (i) transmit the request to an inter-SAS database accessible by multiple SASs and (ii) receive the propagation file from the inter-SAS database.

In at least some of the above embodiments, the first SAS is configured to (i) transmit a query to the second SAS regarding existence of the propagation file at the inter-SAS database and (ii) receive a response from the second SAS indicating that the propagation file is available at the inter-SAS database.

In at least some of the above embodiments, the first SAS is configured to (i) transmit, to an FCC database, a query for information about base stations located near the first-SAS base station and (ii) receive, from the FCC database, identification of the second-SAS base station.

In at least some of the above embodiments, the first SAS is further configured to (i) receive a request for a propagation file for a second first-SAS base station associated with the first SAS and (ii) transmit the propagation file for the second first-SAS base station.

In at least some of the above embodiments, the first SAS is configured to receive the request from a different SAS.

In at least some of the above embodiments, the first SAS is configured to transmit the propagation file for the second first-SAS base station to an inter-SAS database accessible by multiple SASs.

In at least some of the above embodiments, the first SAS is configured to transmit a response to the different SAS indicating that the propagation file for the second first-SAS base station is available at the inter-SAS database.

In at least some of the above embodiments, the first SAS is configured to (i) transmit, to the second first-SAS base station or a network server associated with the second first-SAS base station, a request for the propagation file for the second first-SAS base station and (ii) receive, from the second first-SAS base station or the network server, the propagation file for the second first-SAS base station.

In at least some of the above embodiments, the first SAS is configured to generate the propagation file for the second first-SAS base station.

In at least some of the above embodiments, the first SAS is configured to transmit, to an inter-SAS database accessible by multiple SASs, an outgoing propagation file for the first-SAS base station without receiving a request from a different SAS.

In at least some of the above embodiments, the first-SAS base station and the second-SAS base station are CBRS Devices (CBSDs) of different 5G Citizens Broadband Radio Service (CBRS) communication networks.

In certain embodiments, the present disclosure is an inter-SAS database server comprising a memory configured to store an inter-SAS database; one or more transceivers configured to communicate with multiple SASs; and a processor configured to cause the inter-SAS database server to (i) receive and store propagation files for base stations associated with the multiple SASs; (ii) receive a request for a propagation file for a specified base station; and (iii) transmit the requested propagation file for the specified base station.

In at least some of the above embodiments, the inter-SAS database server is configured to (i) receive the propagation files for the base stations, (ii) receive the request for the propagation file from one of the multiple SASs, and (iii) transmit the requested propagation file to the one of the multiple SASs.

In at least some of the above embodiments, the inter-SAS database server is configured to receive the propagation files from the multiple SASs.

In at least some of the above embodiments, the inter-SAS database server is configured to receive the propagation files from core networks associated with the multiple SASs.

Embodiments of the disclosure may be implemented as (analog, digital, or a hybrid of both analog and digital) circuit-based processes, including possible implementation as a single integrated circuit (such as an ASIC or an FPGA), a multi-chip module, a single card, or a multi-card circuit pack. As would be apparent to one skilled in the art, various functions of circuit elements may also be implemented as processing blocks in a software program. Such software may be employed in, for example, a digital signal processor, micro-controller, general-purpose computer, or other processor.

Also for purposes of this disclosure, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements.

As will be appreciated by one of ordinary skill in the art, the present disclosure may be embodied as an apparatus (including, for example, a system, a machine, a device, a computer program product, and/or the like), as a method (including, for example, a business process, a computer-implemented process, and/or the like), or as any combination of the foregoing. Accordingly, embodiments of the present disclosure may take the form of an entirely software-based embodiment (including firmware, resident software, micro-code, and the like), an entirely hardware embodiment, or an embodiment combining software and hardware aspects that may generally be referred to herein as a "system."

Embodiments of the disclosure can be manifest in the form of methods and apparatuses for practicing those methods. Embodiments of the disclosure can also be manifest in the form of program code embodied in tangible media, such as magnetic recording media, optical recording media, solid state memory, floppy diskettes, CD-ROMs, hard drives, or any other non-transitory machine-readable storage medium, wherein, when the program code is loaded into and executed by a machine, such as a computer, the machine becomes an apparatus for practicing the disclosure. Embodiments of the disclosure can also be manifest in the form of program code, for example, stored in a non-transitory machine-readable storage medium including being loaded into and/or executed by a machine, wherein, when the program code is loaded into and executed by a machine, such as a computer, the machine becomes an apparatus for practicing the disclosure. When implemented on a general-purpose processor, the program code segments combine with the processor to provide a unique device that operates analogously to specific logic circuits.

Any suitable processor-usable/readable or computer-usable/readable storage medium may be utilized. The storage medium may be (without limitation) an electronic, magnetic, optical, electromagnetic, infrared, or semiconductor system, apparatus, or device. A more-specific, non-exhaustive list of possible storage media include a magnetic tape, a portable computer diskette, a hard disk, a random access memory (RAM), a read-only memory (ROM), an erasable programmable read-only memory (EPROM) or Flash memory, a portable compact disc read-only memory (CD-ROM), an optical storage device, and a magnetic storage device. Note that the storage medium could even be paper or another suitable medium upon which the program is printed, since the program can be electronically captured via, for instance, optical scanning of the printing, then compiled, interpreted, or otherwise processed in a suitable manner including but not limited to optical character recognition, if necessary, and then stored in a processor or computer memory. In the context of this disclosure, a suitable storage medium may be any medium that can contain or store a program for use by or in connection with an instruction execution system, apparatus, or device.

The functions of the various elements shown in the figures, including any functional blocks labeled as "processors," may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non-volatile storage. Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

It should be appreciated by those of ordinary skill in the art that any block diagrams herein represent conceptual views of illustrative circuitry embodying the principles of the disclosure. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

Unless explicitly stated otherwise, each numerical value and range should be interpreted as being approximate as if the word "about" or "approximately" preceded the value or range.

It will be further understood that various changes in the details, materials, and arrangements of the parts which have been described and illustrated in order to explain embodiments of this disclosure may be made by those skilled in the art without departing from embodiments of the disclosure encompassed by the following claims.

In this specification including any claims, the term "each" may be used to refer to one or more specified characteristics of a plurality of previously recited elements or steps. When used with the open-ended term "comprising," the recitation of the term "each" does not exclude additional, unrecited elements or steps. Thus, it will be understood that an apparatus may have additional, unrecited elements and a method may have additional, unrecited steps, where the additional, unrecited elements or steps do not have the one or more specified characteristics.

The use of figure numbers and/or figure reference labels in the claims is intended to identify one or more possible embodiments of the claimed subject matter in order to facilitate the interpretation of the claims. Such use is not to be construed as necessarily limiting the scope of those claims to the embodiments shown in the corresponding figures.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the disclosure.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

All documents mentioned herein are hereby incorporated by reference in their entirety or alternatively to provide the disclosure for which they were specifically relied upon.

Reference herein to "one embodiment" or "an embodiment" means that a particular feature, structure, or characteristic described in connection with the embodiment can be included in at least one embodiment of the disclosure. The appearances of the phrase "in one embodiment" in various places in the specification are not necessarily all referring to the same embodiment, nor are separate or alternative embodiments necessarily mutually exclusive of other embodiments. The same applies to the term "implementation."

The embodiments covered by the claims in this application are limited to embodiments that (1) are enabled by this specification and (2) correspond to statutory subject matter. Non-enabled embodiments and embodiments that correspond to non-statutory subject matter are explicitly disclaimed even if they fall within the scope of the claims.

As used herein and in the claims, the term "provide" with respect to an apparatus or with respect to a system, device, or component encompasses designing or fabricating the apparatus, system, device, or component; causing the apparatus, system, device, or component to be designed or fabricated; and/or obtaining the apparatus, system, device, or component by purchase, lease, rental, or other contractual arrangement.

Unless otherwise specified herein, the use of the ordinal adjectives "first," "second," "third," etc., to refer to an object of a plurality of like objects merely indicates that different instances of such like objects are being referred to, and is not intended to imply that the like objects so referred-to have to be in a corresponding order or sequence, either temporally, spatially, in ranking, or in any other manner.

What is claimed is:

1. A first spectrum allocation system (SAS) comprising a processor connected to a memory and a transceiver, wherein the processor is configured to cause the first SAS to:
   transmit a request for a propagation file for a second-SAS base station associated with a second SAS different from the first SAS; and
   receive and use the propagation file to configure a first first-SAS base station associated with the first SAS.

2. The first SAS of claim 1, wherein the first SAS is configured to:
   transmit the request to an inter-SAS database accessible by multiple SASs; and
   receive the propagation file from the inter-SAS database.

3. The first SAS of claim 2, wherein the first SAS is configured to:
   transmit a query to the second SAS regarding existence of the propagation file at the inter-SAS database; and
   receive a response from the second SAS indicating that the propagation file is available at the inter-SAS database.

4. The first SAS of claim 1, wherein the first SAS is configured to:
   transmit, to an FCC (Federal Communications Commission) database, a query for information about base stations located near the first first-SAS base station; and
   receive, from the FCC database, identification of the second-SAS base station.

5. The first SAS of claim 1, wherein the first SAS is further configured to:
   receive a request for a propagation file for a second first-SAS base station associated with the first SAS; and
   transmit the propagation file for the second first-SAS base station.

6. The first SAS of claim 5, wherein the first SAS is configured to receive the request from a different SAS.

7. The first SAS of claim 6, wherein the first SAS is configured to transmit the propagation file for the second first-SAS base station to an inter-SAS database accessible by multiple SASs.

8. The first SAS of claim 7, wherein the first SAS is configured to transmit a response to the different SAS indicating that the propagation file for the second first-SAS base station is available at the inter-SAS database.

9. The first SAS of claim 5, wherein the first SAS is configured to:
   transmit, to the second first-SAS base station or a network server associated with the second first-SAS base station, a request for the propagation file for the second first-SAS base station; and
   receive, from the second first-SAS base station or the network server, the propagation file for the second first-SAS base station.

10. The first SAS of claim 5, wherein the first SAS is configured to generate the propagation file for the second first-SAS base station.

11. The first SAS of claim 1, wherein the first SAS is configured to transmit, to an inter-SAS database accessible by multiple SASs, an outgoing propagation file for the first first-SAS base station without receiving a request from a different SAS.

12. The first SAS of claim 1, wherein the first first-SAS base station and the second-SAS base station are Citizens Broadband Radio Service Devices (CBSDs) of different 5G Citizens Broadband Radio Service (CBRS) communication networks.

13. A method of configuring base stations, wherein the method comprises a first Spectrum Allocation System (SAS):

transmitting a request for a propagation file for a second-SAS base station associated with a second SAS different from the first SAS; and receiving and using the propagation file to configure a first first-SAS base station associated with the first SAS.

14. The method of claim 13, wherein the method comprises the first SAS:

transmitting the request to an inter-SAS database accessible by multiple SASs; and receiving the propagation file from the inter-SAS database.

15. The method of claim 14, wherein the method comprises the first SAS:

transmitting a query to the second SAS regarding existence of the propagation file at the inter-SAS database; and receiving a response from the second SAS indicating that the propagation file is available at the inter-SAS database.

16. The method of claim 13, wherein the method comprises the first SAS:

transmitting, to an FCC (Federal Communications Commission) database, a query for information about base stations located near the first first-SAS base station; and receiving, from the FCC database, identification of the second-SAS base station.

17. The method of claim 13, wherein the method comprises the first SAS:

receiving a request for a propagation file for a second first-SAS base station associated with the first SAS; and transmitting the propagation file for the second first-SAS base station.

18. The method of claim 17, wherein the method comprises the first SAS receiving the request from a different SAS.

19. The method of claim 18, wherein the method comprises the first SAS transmitting the propagation file for the second first-SAS base station to an inter-SAS database accessible by multiple SASs.

20. The method of claim 19, wherein the method comprises the first SAS transmitting a response to the different SAS indicating that the propagation file for the second first-SAS base station is available at the inter-SAS database.

21. The method of claim 17, wherein the method comprises the first SAS:

transmitting, to the second first-SAS base station or a network server associated with the second first-SAS base station, a request for the propagation file for the second first-SAS base station; and receiving, from the second first-SAS base station or the network server, the propagation file for the second first-SAS base station.

22. The method of claim 17, wherein the method comprises the first SAS generating the propagation file for the second first-SAS base station.

23. The method of claim 13, wherein the method comprises the first SAS transmitting, to an inter-SAS database accessible by multiple SASs, an outgoing propagation file for the first first-SAS base station without receiving a request from a different SAS.

24. The method of claim 13, wherein the first first-SAS base station and the second-SAS base station are Citizens Broadband Radio Service Devices (CBSDs) of different 5G Citizens Broadband Radio Serve (CBRS) communication networks.

\* \* \* \* \*